(12) United States Patent
Maldonado

(10) Patent No.: US 9,255,815 B2
(45) Date of Patent: Feb. 9, 2016

(54) FINGERTIP SLIDES FOR GUITAR PLAYING

(71) Applicant: Jonathan Michael Maldonado, Bronx, NY (US)

(72) Inventor: Jonathan Michael Maldonado, Bronx, NY (US)

( * ) Notice: Subject to any disclaimer, the term of this patent is extended or adjusted under 35 U.S.C. 154(b) by 0 days.

(21) Appl. No.: 13/869,226

(22) Filed: Apr. 24, 2013

(65) Prior Publication Data

US 2015/0090095 A1 Apr. 2, 2015

Related U.S. Application Data

(60) Provisional application No. 61/637,474, filed on Apr. 24, 2012.

(51) Int. Cl.
*G10D 3/00* (2006.01)
*G01D 3/00* (2006.01)
*G10D 1/08* (2006.01)

(52) U.S. Cl.
CPC ... *G01D 3/00* (2013.01); *G10D 1/08* (2013.01)

(58) Field of Classification Search
CPC ........................................................ G10D 3/00
See application file for complete search history.

(56) References Cited

U.S. PATENT DOCUMENTS

| | | | | | |
|---|---|---|---|---|---|
| 388,519 | A | * | 8/1888 | Ahlquist | 84/322 |
| D31,151 | S | * | 7/1899 | Richards | D8/3 |
| 1,741,285 | A | * | 12/1929 | Carpenter | 84/322 |
| 1,748,053 | A | * | 2/1930 | Blair | 84/319 |
| 2,466,344 | A | * | 4/1949 | Wright | G10D 3/00 84/319 |
| 3,457,822 | A | * | 7/1969 | Mull | 84/319 |
| 3,638,525 | A | * | 2/1972 | Sciurba et al. | 84/319 |
| 3,741,065 | A | * | 6/1973 | Harris | 84/319 |
| 3,854,368 | A | * | 12/1974 | Pogan | 84/319 |
| 3,927,595 | A | * | 12/1975 | Ferguson | 84/322 |
| 4,681,012 | A | * | 7/1987 | Stelma et al. | 84/422.4 |
| 4,817,488 | A | * | 4/1989 | de los Santos | 84/319 |
| 5,450,778 | A | * | 9/1995 | Roberts | 84/319 |
| 5,488,891 | A | * | 2/1996 | Baker | G10D 3/00 84/319 |
| 5,515,762 | A | * | 5/1996 | Perkins et al. | 84/315 |
| 5,981,856 | A | * | 11/1999 | Story | 84/319 |
| 6,297,435 | B1 | * | 10/2001 | Gutowski | 84/315 |
| 7,476,792 | B1 | * | 1/2009 | Musser | 84/315 |
| 7,572,964 | B2 | * | 8/2009 | Sundby | 84/315 |
| D651,233 | S | * | 12/2011 | Bower | D17/20 |
| 8,399,753 | B2 | * | 3/2013 | Coleman | 84/315 |
| 8,822,800 | B1 | * | 9/2014 | Richmond | 84/422.4 |
| 2005/0045019 | A1 | * | 3/2005 | Wright | 84/319 |
| 2007/0175311 | A1 | * | 8/2007 | Sloan | 84/315 |
| 2015/0065928 | A1 | * | 3/2015 | Christoforou | A61H 7/003 601/138 |
| 2015/0090095 | A1 | * | 4/2015 | Maldonado | G10D 3/00 84/315 |

FOREIGN PATENT DOCUMENTS

AU 9224531 A * 3/1993
IE WO 2004095416 A1 * 11/2004 ............. G10D 3/00

* cited by examiner

*Primary Examiner* — Robert W Horn
(74) *Attorney, Agent, or Firm* — Eric M. Bram

(57) ABSTRACT

A guitar slide adapted to be worn on a musician's finger has an annular end including a hole adapted for receiving the musician's finger, and a semiannular end adapted to extend over a tip of the musician's finger. The semiannular end forms a recess adapted for the musician's finger to rest within and is configured such that the recess becomes wider as the distance from the annular end increases.

2 Claims, 3 Drawing Sheets

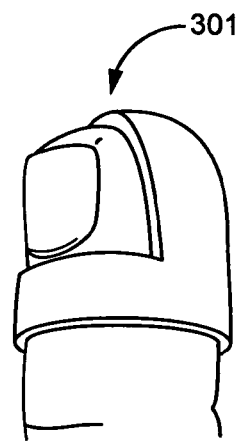
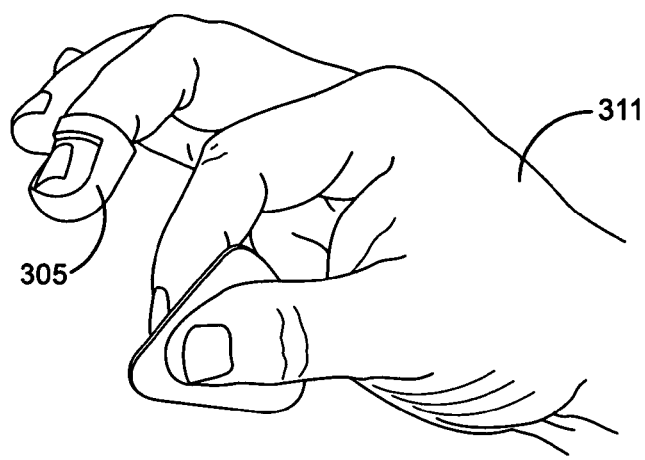
FIG. 3A    FIG. 3B
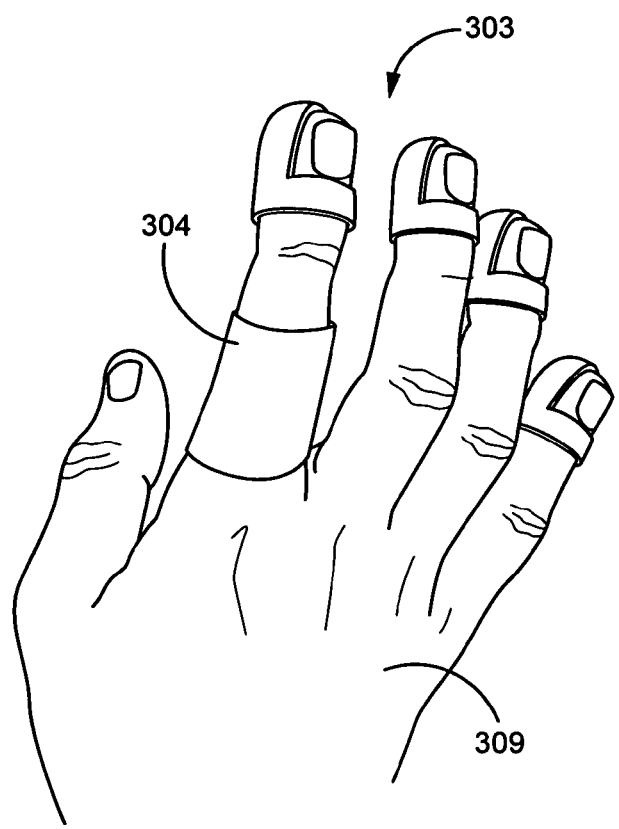
FIG. 3C

FINGERTIP SLIDES FOR GUITAR PLAYING

CROSS-REFERENCE TO RELATED APPLICATIONS

This Application claims the benefit of Provisional Application No. 61/637,474, filed 24 Apr. 2012.

BACKGROUND AND SUMMARY

The present invention relates to handheld devices for pressing guitar strings against the frets of a guitar, and more particularly to a new type and system of finger-operated guitar slides for playing a guitar.

A guitar slide is an instrument used as part of a technique for playing the guitar. Normally the pitch of a guitar string is controlled by pressing the strings against the frets. A guitar slide may be used to alter the pitch of the strings by changing the vibrating length of the strings by a sliding motion of the guitar slide along the strings.

Various types of guitar slides have been made that can fit upon one or more fingers of the hand. For instance, U.S. Pat. No. 6,160,212 to Morse teaches a cylindrical guitar slide that fits over a musician's finger. U.S. Pat. No. 7,476,792 to Musser teaches a cylindrical guitar slide that fits over any musicians finger, that has a variable length depending on how it is twisted around the finger. US Patent Application Publication 2005/0045019 by Wright teaches a finger-ring type device that fits over a finger and attempts to allow the finger to bend normally while a tip of the device presses against the string of a musical instrument. US Patent Application Publication 2007/0175311 by Sloan teaches a glove with slide members affixed to the fingertips of the glove.

It would be advantageous to provide a guitar slide that may be used on different fingers, that may be made with various sizes in order to allow the guitar player to choose whether the slide will cover the first joint of the finger, or not, as well as allowing the guitar player to choose how many strings will be engaged by the slide or slides. This arrangement may give guitar players more sonic possibilities that a conventional guitar slide cannot provide, including the ability to play new chords, voicings, and techniques. Many problems and limitations of conventional guitar slides may be reduced or eliminated, and guitarists may be able to produce new sounds on their instruments.

Using some embodiments of the system of fingertip guitar slide disclosed herein, guitar players may put different slides onto various fingers, so that multiple slides may be used at the same time. Furthermore, while some conventional guitar slides cover various or all of the joints of the finger while playing, the design of the invention disclosed herein may in some embodiments allow the player free movement of his finger joints while playing, affording optimal muscular movement with minimal effort.

Furthermore, with some embodiments of the disclosed invention there may be no need to use alternate guitar tunings to play different intervals while playing in order to get the slide effect. Players may slide 3, 4, 5, and 6 note chord voicings (including barre chords) using the fingertip slides without detuning the guitar. Additionally, by using more than one fingertip slide the musician may allow the playing of open strings in between strings on which the fingertip slides are being applied.

The disclosed fingertips slide system includes embodiments that use small, ergonomic pieces allowing for quicker, more agile movements while achieving the sound of a guitar slide, and more, since the player may provide the slide effect on some strings while applying non-slide fret finger placement on another string or other strings between the strings that are receiving the slide effect.

Accordingly, in one aspect of the current invention, a guitar slide adapted to be worn on a musician's finger comprises an annular end including a hole adapted for receiving the musician's finger, and a semiannular end adapted to extend over a tip of the musician's finger, the semiannular end forming a recess adapted for the musician's finger to rest within and being configured such that the recess becomes wider as the distance from the annular end increases.

BRIEF DESCRIPTION OF THE DRAWING FIGURES

FIGS. 3A-3C illustrate how possible embodiments of fingertip slides according to the invention may be used on fingers of the hands.

DETAILED DESCRIPTION

Figure 1A:
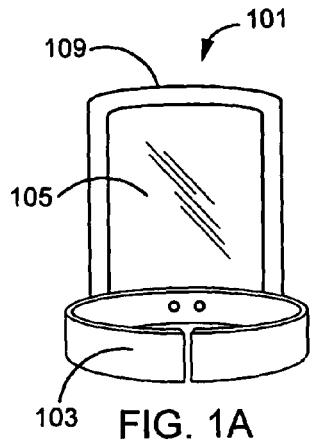
FIGS. 1A-1D illustrate possible embodiments of two-piece fingertip slides according to the invention.
Figure 1C:
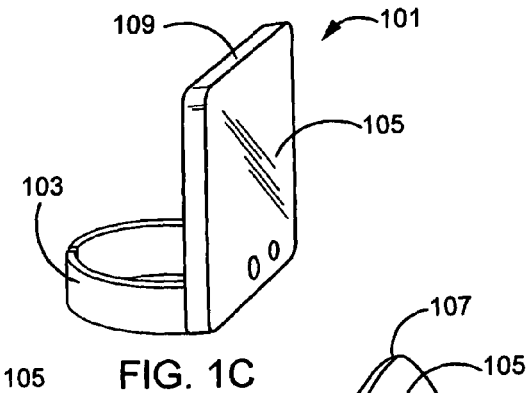
Figure 1B:
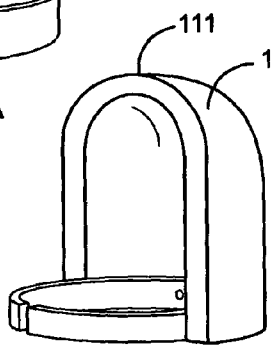
Figure 1D:
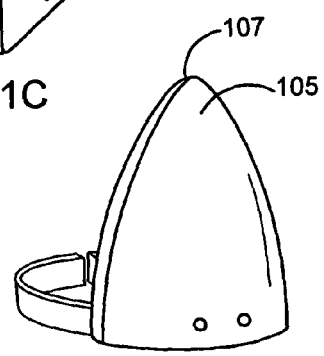
Figure 2A:
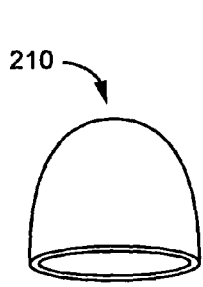
FIGS. 2A-2F illustrate possible embodiments of one-piece fingertip slides according to the invention.
Figure 2B:
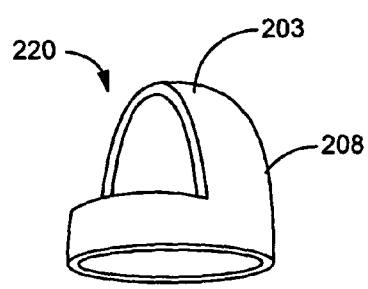
Figures 2C, 2D:
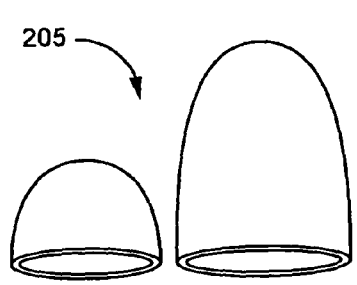
Figure 2E:
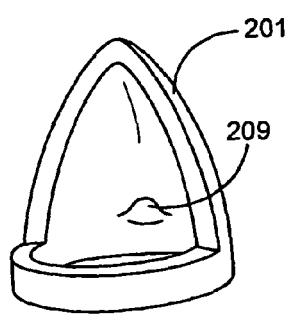
Figure 2F:
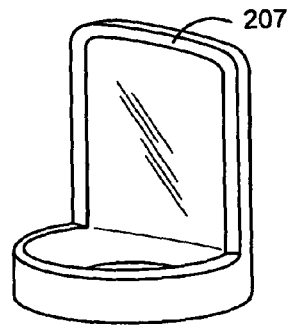

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

In the embodiment illustrated in FIGS. 1A-1D, a fingertip slide 101 may have two parts, an adjustable metal (or plastic or other suitable material) ring 103 configured to fasten on a finger, and a glass (or other suitable material) face 105 that may (though need not be) be tapered at top, configured to catch the top of the finger and/or be used to stretch the string. Various shapes may be selected, such as pointed 107, flat 109, or rounded 111, for the tip. Using glass for the face produces a desired effect, but in other embodiments, glass-like or other materials could be used.

It should be appreciated that numerous configurations or physical constructions for the fingertips slide are possible. Other possible embodiments of the invention are shown in FIGS. 2A-2F. Fingertip slides may have pointed 201 or rounded 203 tips, may be of varied lengths 205, may have flat 207 or rounded 208 faces, and may include internal protrusions 209 optimally placed to catch and hold the finger. Other embodiments are possible as well.

In FIGS. 3A-3C an exemplary embodiment of the fingertip slide 301 is shown, indicating where the point of contact with a guitar string may be. As illustrated in FIG. 3, various embodiments of the invention may be utilized to provide different options for wearing the slide. For example 303 in FIG. 3C, up to four fingers on the fretting hand 309 may be outfitted at their tips with the fingertip slide, while a short conventional (e.g., glass cylinder or bottleneck) slide 304 may be placed lower down on the index or pointer finger for example. Fewer than four fingers may be outfitted with the fingertip slide for lead playing, for instance.

A fingertip slide may be placed on one or more fingers of the picking or strumming hand 311 as well. A fingertip slide 305 could be utilized on one finger, the middle finger for instance, for applying sound textures while playing the guitar finger style (e.g., "fingerpicking"). Of course, fingertips slides may be used on more than one finger for this purpose as well.

Figures 4A, 4B:
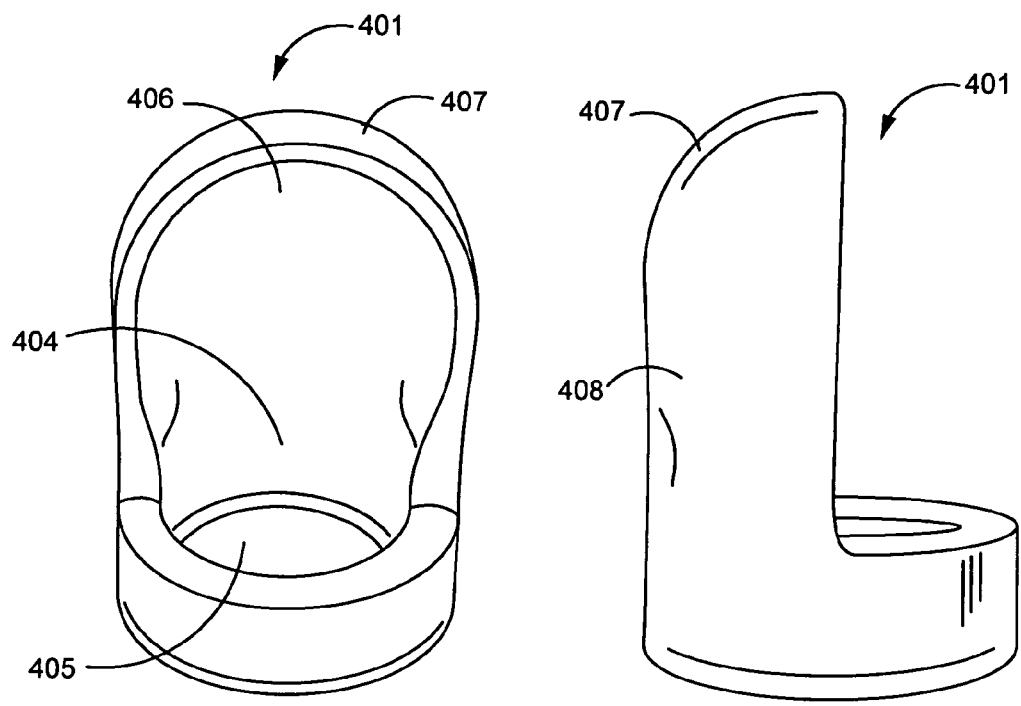
FIGS. 4A-4C illustrate three different perspective views of the same fingertip slide according to an exemplary embodiment of the invention.
Figure 4C:
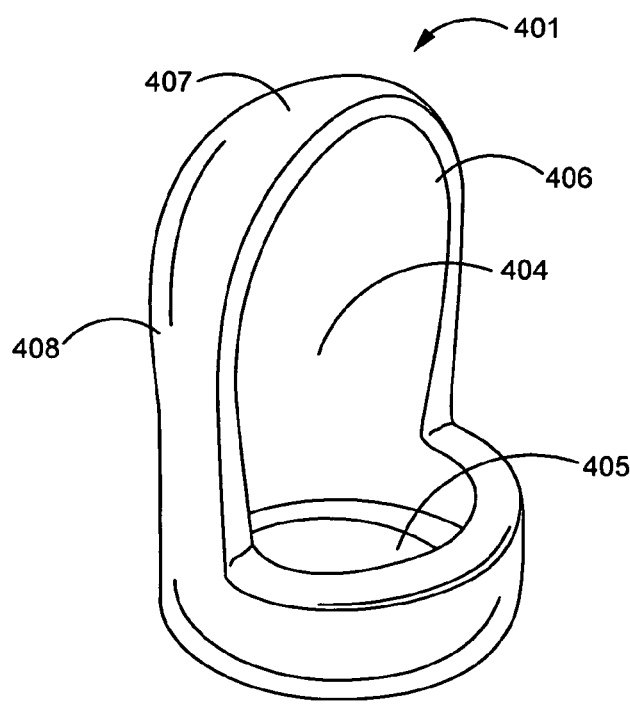

FIGS. 4A-4C show an exemplary embodiment of a finger slide according to the invention. In this embodiment, the fingertip slide 401 may be a single cast and/or molded piece of material. A hollow opening 404 closest to the tip of the fingertip slide may be cut wider than the entrance 405. The hole may get smoothly wider 406 towards the tip 407 of the slide in order to catch the fatter part of a fingertip, while the outer convex shell-face 408 retains its pure half-cylindrical form.

It should be understood, of course, that the foregoing relates to exemplary embodiments of the invention and that modifications may be made without departing from the spirit and scope of the invention as set forth in the following claims.

I claim:

1. A guitar slide adapted to be worn on a musician's finger, comprising:
   an annular end including a hole adapted for receiving the musician's finger; and
   a semiannular end adapted to extend over and curve in front of at least a portion of the tip of the musician's finger, the semiannular end forming a recess adapted for the musician's finger to rest within and being configured such that the recess becomes gradually wider as the distance from the annular end increases,
   wherein the length of the slide extends from about the tip of the finger to the first finger joint.

2. The guitar slide of claim 1, including means for facilitating retention of the slide on the musician's finger, said means comprising said widening of the recess as the distance from the annular end increases.

\* \* \* \* \*